United States Patent [19]
Holgate

[11] Patent Number: 5,798,755
[45] Date of Patent: Aug. 25, 1998

[54] COMPUTER MOUSE HANDWRITING TRANSFER DEVICE

[76] Inventor: Lawrence D. Holgate, 10714 Desoto Rd., Riverview, Fla. 33569

[21] Appl. No.: 744,943

[22] Filed: Nov. 6, 1996

[51] Int. Cl.⁶ .................................................. G09G 5/08
[52] U.S. Cl. .......................... 345/163; 345/169; 345/179; 178/18; 340/709
[58] Field of Search ................................ 345/163, 156, 345/157, 164, 169, 179; 178/18, 19, 20; 382/185, 186, 187, 188, 189, 181; 340/706, 709

[56] References Cited

U.S. PATENT DOCUMENTS

| | | | |
|---|---|---|---|
| 4,814,552 | 3/1989 | Stefik et al. | 178/18 |
| 5,428,355 | 6/1995 | Jondrow et al. | 341/20 |
| 5,517,576 | 5/1996 | Altman et al. | 382/181 |
| 5,613,019 | 3/1997 | Altman et al. | 382/311 |
| 5,644,735 | 7/1997 | Luciw et al. | 395/338 |

*Primary Examiner*—Jeffery Hofsass
*Assistant Examiner*—Davetta Woods

[57] ABSTRACT

A new Computer Mouse Handwriting Transfer Device for capturing human handwriting movements with a computer mouse. The inventive device includes a first plate member moveable in a first direction and blocked from movement in a second direction orthogonal to the first direction. A second plate member rests on the first plate member and is moveable with the first plate member in the first direction and is moveable independently in the second direction. Barrier walls block first and second direction movement of a computer mouse having its sensing ball in contact with the upper surface of the second plate member so that movement of the second plate member is communicated to the sensing ball of the computer mouse. The second plate member has a recess therein for receiving the end of a writing instrument so that handwriting movements of the hand writing tool may be transferred to the sensing ball of the computer device.

9 Claims, 3 Drawing Sheets

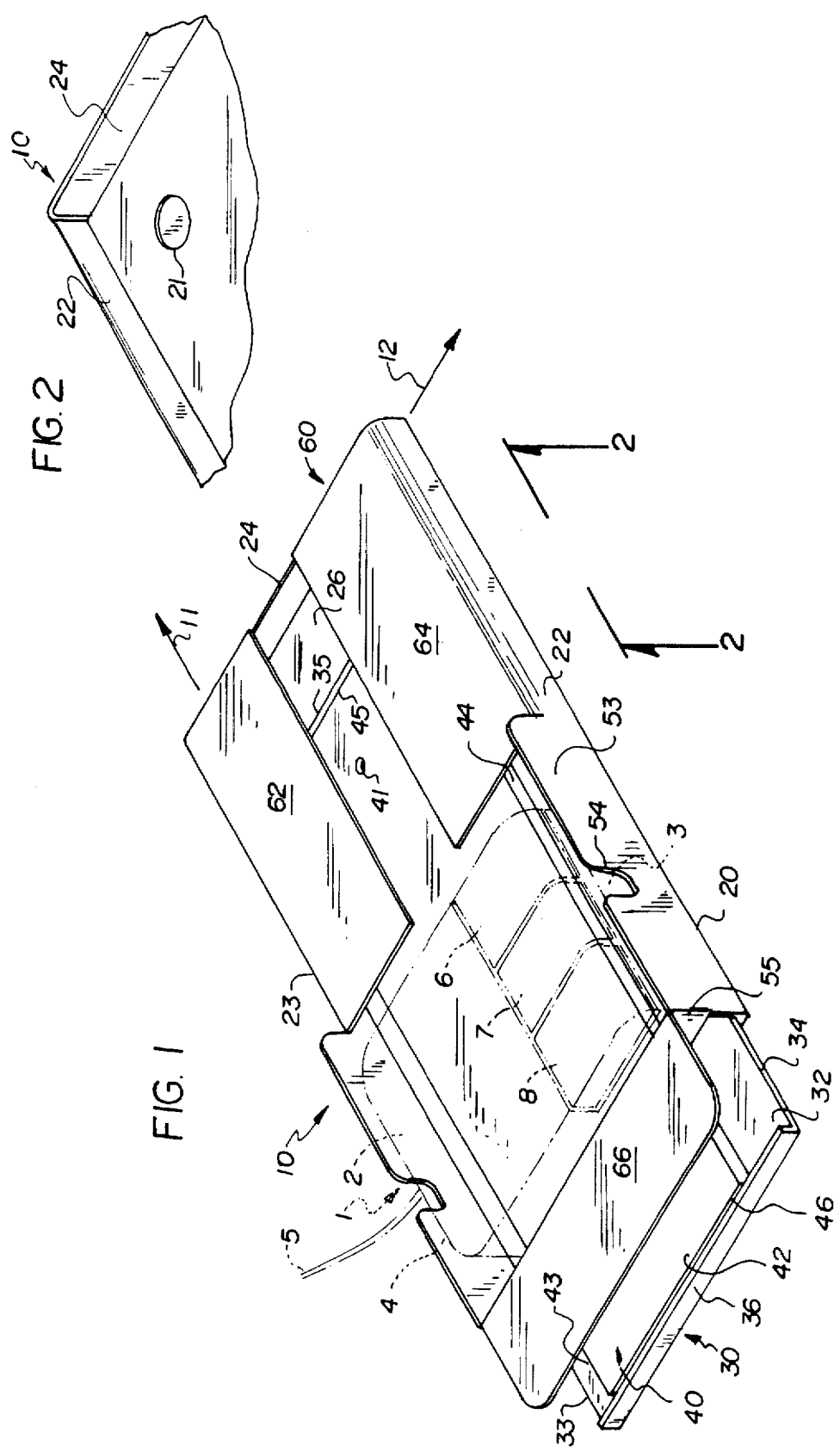

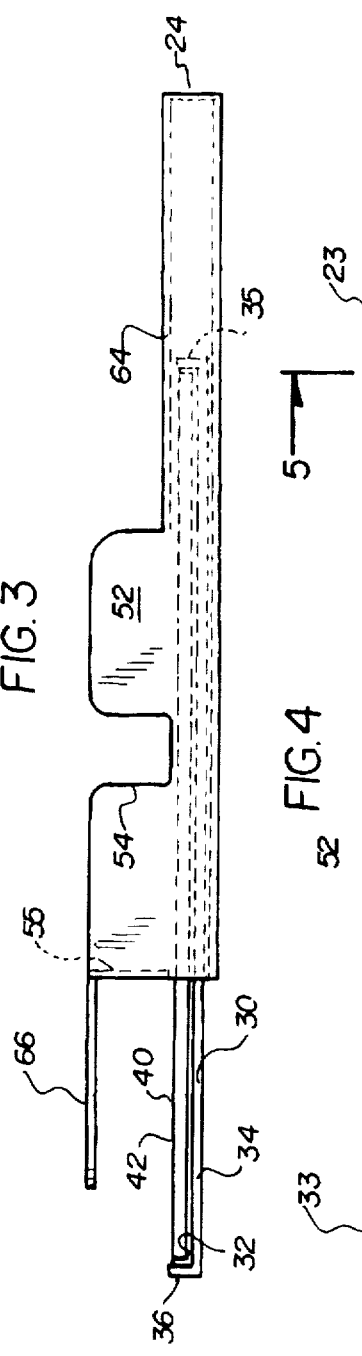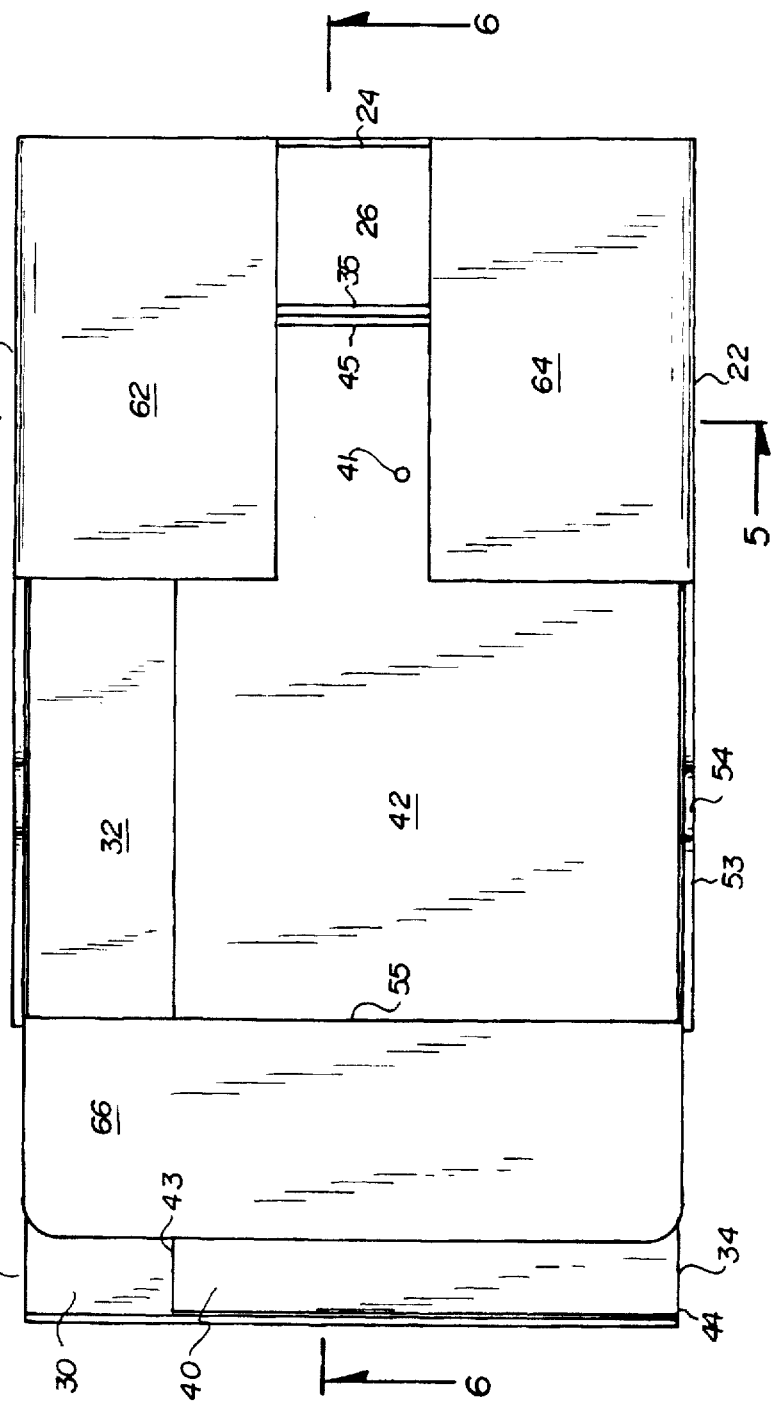

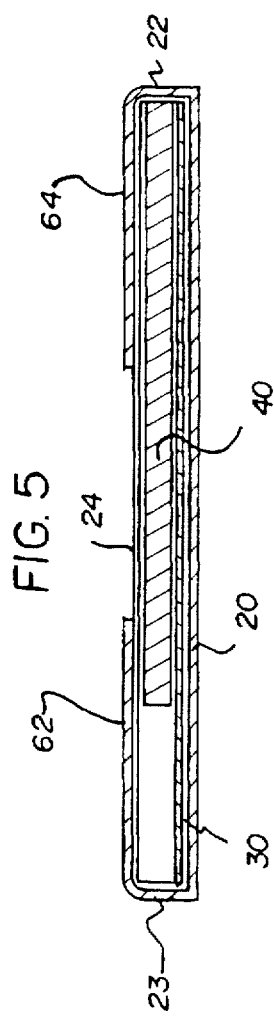
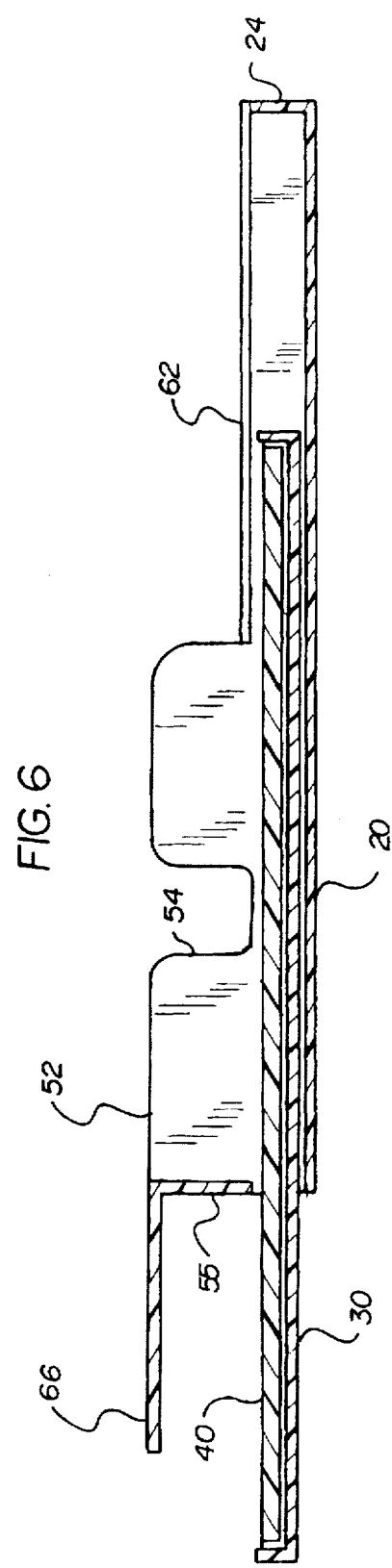

COMPUTER MOUSE HANDWRITING TRANSFER DEVICE

BACKGROUND OF THE INVENTION

1. Field of the Invention

The present invention relates to devices for entering handwriting movements into a computer and more particularly pertains to a new Computer Mouse Handwriting Transfer Device for capturing human handwriting movements with a computer pointing device, such as a computer mouse.

2. Description of the Prior Art

The use of devices for entering handwriting movements into a computer is known in the prior art. More specifically, devices for entering handwriting movements into a computer heretofore devised and utilized are known to consist basically of familiar, expected and obvious structural configurations, notwithstanding the myriad of designs encompassed by the crowded prior art which have been developed for the fulfillment of countless objectives and requirements.

Known prior art devices for entering handwriting movements into a computer include U.S. Pat. No. 5,380,958, U.S. Pat. No. 5,159,321; U.S. Pat. No. 5,247,137, U.S. Pat. No. 4,831,736; U.S. Pat. No. 4,561,183, U.S. Pat. No. 5,019,677, U.S. Pat. No. 5,132,671, and U.S. Pat. No. 5,107,541.

While these devices fulfill their respective, particular objectives and requirements, the aforementioned patents do not disclose a new Computer Mouse Handwriting Transfer Device of the present invention.

SUMMARY OF THE INVENTION

In view of the foregoing disadvantages inherent in the known types of devices for entering handwriting movements into a computer now present in the prior art, the present invention provides a new Computer Mouse Handwriting Transfer Device construction wherein the same can be utilized for capturing human handwriting movements with a computer mouse.

The general purpose of the present invention, which will be described subsequently in greater detail, is to provide a new Computer Mouse Handwriting Transfer Device apparatus and method which has many of the advantages of the devices for entering handwriting movements into a computer mentioned heretofore and many novel features that result in a new Computer Mouse Handwriting Transfer Device which is not anticipated, rendered obvious, suggested, or even implied by any of the prior art devices for entering handwriting movements into a computer, either alone or in any combination thereof.

To attain this, the device of the present invention for capturing human handwriting movements with a computer mouse generally comprises a first plate member having a planar first upper surface. The first plate member is freely movable in a first direction extending parallel to the first upper surface and is blocked from moving in a second direction extending parallel to the first upper surface and orthogonal to the first direction. The device also comprises a second plate member having a planar second upper surface. The second plate member is moveable with the first plate member in the first direction and is movable with respect to the first plate member in the second direction. The device further comprises a restricting means for restricting movement in the first and second directions of a computer mouse having its sensing ball in contact with the second upper surface of the second plate member for rolling movement therewith. The second plate member has a recess in the second upper surface thereof for receiving an end of a hand-grippable tool such that handwriting movements imparted to the hand-grippable tool by a hand are transferred to the second plate member. The second plate member is freely movable in the first and second directions relative to the computer mouse such that movements of a hand-grippable tool inserted in the recess are transferred to the sensing ball of the computer mouse.

The most preferred handwriting transfer device of the invention additionally comprises a base plate member having a planar base upper surface oriented parallel to the first upper surface of the first plate member. Also preferred is a first blocking means comprised of a pair of opposed side walls mounted on the base plate member and oriented perpendicular to the first upper surface of the first plate member, with the opposed side walls being located on opposite sides of the first plate member such that the opposed side walls substantially block movement of the first plate member in the second direction.

The most preferred restricting means comprises upstanding members located so as to be closely adjacent to at least two opposite surfaces of a computer mouse rested on the second upper surface of the second plate member. A hand support surface is also preferably provided. The most preferred first plate member has opposed upstanding lips for abutting against the opposite ends of the second plate member for blocking first direction movement of the first plate member with respect to the second plate member.

In these respects, the Computer Mouse Handwriting Transfer Device according to the present invention substantially departs from the conventional concepts and designs of the prior art, and in so doing provides an apparatus primarily developed for the purpose of capturing human handwriting movements with a computer mouse.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Computer Mouse handwriting transfer device apparatus and method which has many of the advantages of the devices for entering handwriting movements into a computer mentioned heretofore and many novel features that result in a new computer mouse handwriting Transfer Device which is not anticipated, rendered obvious, suggested, or even implied by any of the prior art devices for entering handwriting movements into a computer, either alone or in any combination thereof.

It is another object of the present invention to provide a new Computer Mouse Handwriting Transfer Device which may be easily and efficiently manufactured and marketed.

It is a further object of the present invention to provide a new Computer Mouse Handwriting Transfer Device which is of a durable and reliable construction.

An even further object of the present invention is to provide a new Computer Mouse Handwriting Transfer Device which is susceptible of a low cost of manufacture with regard to both materials and labor, and which accordingly is then susceptible of low prices of sale to the consuming public, thereby making such Computer Mouse Handwriting Transfer Device economically available to the buying public.

Still yet another object of the present invention is to provide a new Computer Mouse Handwriting Transfer Device which provides in the apparatuses and methods of the prior art some of the advantages thereof, while simultaneously overcoming some of the disadvantages normally associated therewith.

Still another object of the present invention is to provide a new Computer Mouse handwriting transfer device for capturing human handwriting movements with a computer mouse.

Still yet another object of the present invention is to provide a new Computer Mouse Handwriting Transfer Device that utilizes the computer mouse already utilized with almost every personal computer, and enhances the versatility of the mouse with a compact and easy to use device.

Even still another object of the present invention is to provide a new Computer Mouse Handwriting Transfer Device that avoids the need for investment in expensive and complicated devices that are designed solely for and thus limited to the transfer of handwriting into a computer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic rear perspective view of a new Computer Mouse Handwriting Transfer Device according to the present invention, and particularly illustrates a computer mouse positioned for use with the new device.

FIG. 2 is a schematic bottom perspective view of a broken away portion of the new handwriting transfer device particularly illustrating the location of a foot on the bottom of the device.

FIG. 3 is a schematic side view of the handwriting transfer device of the invention.

FIG. 4 is a schematic top view of the invention.

FIG. 5 is a schematic cross sectional view of the handwriting transfer device taken along line 5—5 of FIG. 4.

FIG. 6 is a schematic cross sectional view of the handwriting transfer device taken along line 6—6 of FIG. 4.

DESCRIPTION OF THE PREFERRED EMBODIMENT

With reference now to the drawings, and in particular to FIGS. 1 through 6 thereof, a new Computer Mouse Handwriting Transfer Device embodying the principles and concepts of the present invention and generally designated by the reference numeral 10 will be described.

More specifically, it will be noted that the Computer Mouse Handwriting Transfer Device 10 comprises a base plate member 20, a first plate member 30, a second plate member 40 and a mouse restricting means 50.

The handwriting transfer device 10 of the invention utilizes a number of plate members that are selectively moveable with respect to each other to transfer the movements of the tip of a handwriting tool to the sensing ball of a computer mouse 1 installed on the device 10.

A suitable computer mouse pointing device 1 (see FIG. 1) for use with the handwriting transfer device 10 of the invention is of a basically conventional and readily available design, although the specific design may vary from the mouse described herein and still be useful with the invention. The mouse 1 includes a front surface 3 and a rear surface 4 on opposite sides of the computer mouse housing or case 2. A mouse cord 5 typically connects the mouse 1 to a personal computer (not shown), and the cord 5 usually enters the mouse case 2 through the front surface 3 or the rear surface 4 of the mouse case 2 (as shown in FIG. 1), although other cord arrangements, including the complete absence thereof, may be used. The mouse 1 has a set of buttons located adjacent to the front surface 3 of the mouse case 2. The set of buttons typically includes a left button 6 and a right button 8, and may also include a center button 7 between the left 6 and right 8 buttons. A sensing ball (not shown) housed within a recess in the case 2 retractably protrudes from the bottom surface of the mouse case 2 for making contact with a surface on which the bottom surface of the mouse 1 is rested. Lateral movement of the mouse 1 with respect to the surface upon which it is rested and the friction between the sensing ball and the surface produces a rotation of the ball in a manner that can be corresponded to the lateral movement of the mouse 1.

The handwriting transfer device 10 preferably includes a substantially planar base plate member 20 that forms the lowermost or bottom portion of the device 10, and may be rested on a flat work surface with rubber feet 21 (see FIG. 2) that resist lateral movement of the device 10 with respect to the work surface during transfer device usage. The base plate member 20 has a planar base upper surface 26 that is oriented substantially parallel to the work surface on which the device 10 is rested. The base plate member 20 ideally includes spaced front 22 and rear 23 walls extending perpendicularly and upwardly from the base plate member. Optionally, the base plate member 20 is provided with an end wall 24 on one end of the base plate member 20 that ideally extends between the front 22 and rear 23 walls.

First 11 and second 12 directions may be established with respect to the handwriting transfer device 10 and to the base plate member upper surface 26. The first 11 and second 12 directions both extend parallel to the base upper surface 26 (and ideally parallel to the worksurface upon which the transfer device 10 rests). The first 11 and second 12 directions are perpendicular or orthogonal to each other (i.e., with a 90 degree angle between them). The first direction 11 extends generally parallel to the front 22 and rear 23 walls of the base plate member 20, and the second direction 12 extends generally perpendicular to the front 22 and 23 rear walls and parallel to the end wall 24.

The handwriting transfer device 10 also includes a first plate member 30 that is preferably substantially planar and is supported or rested or stacked upon the base upper surface 26 of the base plate 20. The first plate member 30 has a planar first plate upper surface 32, and a front 33 and rear 34 edges. At the ends of the first plate member 30 are spaced end walls or lips 35 and 36 which extend perpendicularly (upward) from the upper planar surface 32 of the first plate member 30 and preferably extend substantially the entire distance between the front 33 and rear 34 edges of the plate member 30. The first upper surface 32 is substantially parallel to the base upper surface 26, and consequently the first 11 and second 12 directions are also parallel to the first upper surface 32.

A significant characteristic of the handwriting transfer device 10 is that the first plate member 30 is freely movable in the first direction 11 and is simultaneously restrained or prevented or blocked from moving in the second direction 12. The preferred means for restricting or blocking movement of the first plate member 30 in the second direction 12 is the front 22 and rear 23 walls of the base plate member 20. Significantly, the spacing between the front 22 and rear 23 walls should substantially correspond to the width of the first plate member 30 (e.g., the distance between the front edge 33 and the rear edge 34 of the first plate) so that a relatively snug and secure fit is produced between the first plate member 30 and the walls 22, 23 without restricting or hindering movement of the first plate member 30 in the first direction 11.

The handwriting transfer device 10 further includes a second plate member 40 that is located above the base 20 and first 30 plate members, and preferably rests upon the first upper surface 32 of the first plate member 30. The second plate member 40 has a planar second upper surface 42. Preferably the second plate member 40 has a thickness that is thicker than the first plate member 30 or the base plate member 20. The second plate member is bounded by spaced front 43 and rear 44 sides, and by spaced ends 45, 46.

A significant characteristic of the second plate member 40 is that the second plate member 40 is freely movable in the second direction 12 with respect to the first plate member 30 (and with respect to the base plate member 20). However, the second plate member 40 is movable in the first direction 11 only with the first plate member 30 so that both the first and second plate members must move together in the first direction 11 (e.g., at the same speed with respect to the base plate 20). Preferably, this relative movement relationship between the first 30 and the second 40 plate members is accomplished by elements of the first plate member 30. Ideally, the spaced end lips 35, 36 of the first plate member 30 block movement of the second plate member 40 relative to the first plate member 30. The spacing between the end lips 35, 36 is significant and preferably is such that the second plate member 40 is freely movable across the first plate member upper surface 32 in directions toward or away from the front 33 and rear 34 edges of the first plate member 30 (i.e., in the first direction 11), but movement of the second plate member 40 in the second direction 12 is blocked by the end lips 35, 36 of the first plate member 30. Contact between the edge 33, 34 of the second plate 40 and the end lips 35, 36 of the first plate 30 causes or urges the first plate member to move with the second plate member in the first direction 11. Preferably, the end lips 35, 36 of the first plate member 30 are located closely adjacent to the ends 45, 46 of the second plate member 40, but the end lips are not capable of simultaneous frictional contact with the plate ends 45, 46 at the same time, a condition which might hinder the free movement of the second plate member 40 in the second direction 12.

A significant feature of the second plate member 40 is a recess 41 in the upper surface 42 thereof for receiving the pointed or tapered end of a hand-grippable tool (not shown). The hand-grippable tool typically has an elongate and rounded shape, and will most ideally and conveniently comprise a pen or pencil or other handwriting tool or instrument that is typically used for handwriting, and especially used for writing a personal signature. Insertion of the tip of a writing instrument into the recess 41 permits the movement of the tip of the instrument to produce a corresponding movement of the second plate member 40 in the first 11 and second 12 directions, and in turn movement of the first plate member 20 in the first direction 11.

For use of the handwriting transfer device 10, a computer mouse 1 is rested on the second upper surface 42 of the second plate member 40 with the sensing ball of the mouse in contact with the upper surface 42. To permit the movement of the second upper surface 42 of the second plate member 40 to be transmitted to the sensing ball of the mouse 1, the case 2 of the mouse 1 must be restrained from moving with the second plate member 40. The handwriting transfer device 10 preferably includes means 50 for restricting the movement of the mouse 1 as it rests upon the second upper surface 42 of the second plate member 40. The most preferred mouse restricting means 50 for the invention comprises barrier structures that block or restrict lateral movement of the mouse 1 with the second plate member 40 and keep the mouse stationary or motionless with respect to the base plate member 20. The most preferred barrier structures include front 52 and rear 53 barrier walls that abut against the front 3 and rear 4 surfaces of the mouse 1 when the mouse is rested on the second plate member 40. The front 52 and rear 53 barrier walls are ideally formed by upward extensions of the front 22 and rear 23 walls of the base plate member 20 beyond the level or height of the first 30 and second 40 plate members. The front 52 and rear 53 barrier walls are ideally provided with a notch 5 for accommodating the mouse cord 5 protruding from the mouse case 2. A side barrier wall 55 may also be provided to prevent sideward lateral movement of the mouse 1.

The handwriting transfer device 10 also preferably includes structure for providing support of the hand in a convenient position for performing the handwriting movements in a natural manner so that entering handwriting movements into the transfer device 10 is substantially as comfortable and natural as writing on paper. The most preferred hand support structure 60 has a front support 62 and a rear support 64 that form a composite support surface above and substantially parallel to (and free of) the second upper surface 42 of the second plate member 40. The front support 62 is preferably an extension of the front wall 22 of the base plate member 20, and the rear support member 64 is preferably an extension of the rear wall 23 of the base plate member 20. The front 62 and rear 64 supports of the structure 60 ideally cantilever or extend out over the second upper surface 42 of the second plate member 40. Preferably the front 62 and rear 64 supports do not meet together, and space is left therebetween to permit movement between the supports 62, 64 for a handwriting instrument whose tip or point is inserted in the recess 41 in the upper surface 42 of the second plate member 40. A side support 66 is preferably provided as an extension of the side barrier wall 55 for support of a hand in close and convenient proximity to the buttons 6, 7 and 8 of the mouse 1. The front 62 and rear 64 supports may also provide a barrier to sideways or lateral movement of the mouse 1.

The respective contacting surfaces of the base 20, first 30 and second 40 plate members (e.g., the upper surfaces of the base and first members and the lower surfaces (not shown) of the first and second plate members) are preferably of a substantially frictionless character, such as may be provided by the use of a low friction material for forming the plate members or by the use of a coating of low friction material (such as is sold under the TEFLON tradename) on the contacting surfaces of the plate members. The low friction character is critical to the ease of accurate entry and reproduction of handwriting, and especially signatures.

It will be realized by those skilled in the art that the base plate member 20 could be omitted from the device 10 and the movement limiting function of the front 22 and rear 23 walls of the base plate member 20 provided in another manner, such as by a frame or skeletal elements that do not extend below the first plate member. However, the use of the base plate member is preferred for providing a substantially frictionless surface for movement of the first plate member thereon.

Significantly, the handwriting transfer device 10 permits the use of a conventional computer mouse pointing device to transfer the handwriting movements of the human hand to a computer in a manner reproducible by the computer in the memory or storage means of the computer, and permits the transmission of a digital signal representation of the handwriting over various means of electronic signal transmission such as telephone, television or radio transmissions using electronic, optical or radio signals.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. A device for capturing human handwriting movements with a computer mouse of the type having a sensing ball for detecting movement of said mouse across a work surface and generating electronic signals corresponding to the movement, said device comprising:

a first plate member having a planar first upper surface, said first plate member being freely movable in a first direction extending parallel to said first upper surface, said first plate member being blocked from moving in a second direction extending parallel to said first upper surface and orthogonal to said first direction, a second plate member having a planar second upper surface, said second plate member resting on the first upper surface of said first plate member and being moveable independently of said first plate member in said first direction and being movable with respect to said first plate member in said second direction, and restricting means for restricting movement in said first and second directions of a computer mouse having its sensing ball in contact with the second upper surface of said second plate member for rolling movement therewith, wherein said second plate member has a recess in the second upper surface thereof for receiving an end of a hand-grippable tool such that handwriting movements imparted to said hand-grippable tool by a hand are transferred to said second plate member, said second plate member being freely movable in said first and second directions relative to said computer mouse such that movements of a said hand-grippable tool inserted in said recess are transferred to the sensing ball of said computer mouse.

2. The device of claim 1 additionally comprising a base plate member located below said first plate member and having a planar base upper surface on which said first plate member is slidingly moveable.

3. The device of claim 1 additionally comprising a first blocking means for blocking movement of said first plate member in said second direction.

4. The device of claim 3 additionally comprising a base plate member below said first plate member, and wherein said first blocking means comprises a pair of opposed side walls mounted on said base plate member and oriented perpendicular to the first upper surface of said first plate member, said opposed side wall being located on opposite sides of said first plate member such that said opposed side walls substantially block movement of said first plate member in said second direction.

5. The device of claim 1 additionally comprising a base plate member below said first plate member, and wherein said restricting means comprises upstanding barrier members mounted on said base plate member so as to be stationary with respect to said first and second plate members, said upstanding barrier members being located so as to be closely adjacent to at least two opposite surfaces of a computer mouse rested on the second upper surface of said second plate member.

6. The device of claim 1 additionally comprising a hand support surface oriented substantially parallel to and above the second upper surface of said second plate proximate to the recess in said second plate member.

7. The device of claim 6 additionally comprising a base plate member having a side wall oriented perpendicular to the first upper surface of said first plate member, and a support wall attached to said side wall with said hand support surface thereon.

8. The device of claim 1 additionally comprising a second blocking means for blocking first direction movement of said second plate member with respect to said first plate member.

9. The device of claim 8 wherein said second blocking means comprises opposed upstanding lips on said first plate member for abutting against the opposite ends of said second plate member.

* * * * *